United States Patent
McNutt et al.

(10) Patent No.: US 12,489,957 B1
(45) Date of Patent: Dec. 2, 2025

(54) HEADEND CONTROLLER AND METHOD OF USE

(71) Applicant: Z-Band Technologies, LLC, Carlisle, PA (US)

(72) Inventors: Mark E. McNutt, Carlisle, PA (US); Harish K.G. Palakurthi, Carlisle, PA (US)

(73) Assignee: Z-Band Technologies, LLC, Carlisle, PA (US)

( * ) Notice: Subject to any disclaimer, the term of this patent is extended or adjusted under 35 U.S.C. 154(b) by 0 days.

(21) Appl. No.: 18/732,031

(22) Filed: Jun. 3, 2024

Related U.S. Application Data

(60) Provisional application No. 63/471,186, filed on Jun. 5, 2023.

(51) Int. Cl.
*H04N 21/61* (2011.01)

(52) U.S. Cl.
CPC ........... *H04N 21/61* (2013.01); *H04N 21/615* (2013.01)

(58) Field of Classification Search
CPC .............................. H04N 21/61; H04N 21/615
See application file for complete search history.

(56) References Cited

U.S. PATENT DOCUMENTS

| | | | | |
|---|---|---|---|---|
| 4,920,233 A | * | 4/1990 | Kincaid | H01B 11/146 178/45 |
| 5,125,100 A | * | 6/1992 | Katznelson | H04H 20/78 348/E7.024 |
| 5,399,927 A | * | 3/1995 | Gruber | H03F 3/72 327/404 |
| 5,481,389 A | * | 1/1996 | Pidgeon | H04B 10/2933 398/208 |
| 5,594,394 A | * | 1/1997 | Sasaki | H01Q 21/30 333/202 |
| 5,604,528 A | * | 2/1997 | Edwards | H04N 7/1675 380/240 |
| 5,738,525 A | * | 4/1998 | Davies | G09B 9/00 348/192 |
| 5,793,606 A | * | 8/1998 | Cubbage | G06F 1/1658 361/679.55 |
| 5,834,697 A | * | 11/1998 | Baker | H01B 11/02 174/34 |
| 5,854,736 A | * | 12/1998 | Fuhs | G06F 1/263 361/679.55 |
| 5,898,899 A | * | 4/1999 | Ellis | H04N 7/102 348/192 |
| 5,930,678 A | * | 7/1999 | Alley | H04L 5/06 455/69 |
| 6,466,913 B1 | * | 10/2002 | Yasuda | G10L 21/00 704/E21.001 |
| 6,721,371 B1 | * | 4/2004 | Barham | H03H 17/0294 329/363 |
| 6,820,196 B2 | * | 11/2004 | Kessler | H04N 21/8166 713/1 |
| 6,915,530 B1 | * | 7/2005 | Kauffman | H04N 7/102 455/295 |
| 9,131,214 B2 | | 9/2015 | Lewis | |
| 9,210,419 B2 | | 12/2015 | Barrett et al. | |
| 9,325,987 B2 | | 4/2016 | Grzelka et al. | |
| 9,571,826 B1 | | 2/2017 | Azralon et al. | |

(Continued)

*Primary Examiner* — Michael B. Pierorazio
(74) *Attorney, Agent, or Firm* — Hooker & Habib, P.C.

(57) ABSTRACT

A headend controller and its method of use allows for the processing, monitoring and distribution of CATV RF electrical signals within a network.

17 Claims, 12 Drawing Sheets

(56) References Cited

U.S. PATENT DOCUMENTS

| | | | |
|---|---|---|---|
| 9,876,592 B2 | 1/2018 | Fuller et al. | |
| 9,992,551 B1 | 6/2018 | Azralon et al. | |
| 10,256,931 B2 | 4/2019 | Fuller et al. | |
| 10,306,330 B1 | 5/2019 | Azralon et al. | |
| 10,560,757 B1 | 2/2020 | Azralon et al. | |
| 10,581,539 B2 | 3/2020 | Fuller et al. | |
| 10,708,668 B2 | 7/2020 | Zerfas et al. | |
| 10,785,829 B2 | 9/2020 | Palle et al. | |
| 10,903,923 B2 | 1/2021 | Han et al. | |
| 10,917,224 B2 | 2/2021 | Coomans et al. | |
| 11,039,220 B2 | 6/2021 | Zerfas et al. | |
| 11,166,070 B1 | 11/2021 | Zydel et al. | |
| 2001/0046268 A1* | 11/2001 | Sharma | H04J 1/05 348/E7.069 |
| 2002/0056135 A1* | 5/2002 | Sharma | H04N 7/22 348/E7.07 |
| 2003/0046706 A1* | 3/2003 | Rakib | H04N 7/106 725/111 |
| 2004/0244053 A1* | 12/2004 | Golombek | H04N 21/6118 725/127 |
| 2005/0056454 A1* | 3/2005 | Clark | H01B 11/02 174/113 R |
| 2006/0015921 A1* | 1/2006 | Vaughan | H04M 7/006 725/127 |
| 2006/0094394 A1* | 5/2006 | Yamamoto | H04B 1/006 455/341 |
| 2006/0141976 A1* | 6/2006 | Rohde | H03D 7/1441 455/326 |
| 2006/0161958 A1* | 7/2006 | Choung | H04N 21/4122 725/78 |
| 2007/0046835 A1* | 3/2007 | Kim | H04N 21/42204 348/731 |
| 2008/0063216 A1* | 3/2008 | Sakata | H04S 3/008 381/80 |
| 2008/0211918 A1 | 9/2008 | Balz | |
| 2008/0227333 A1* | 9/2008 | Hazani | H01R 13/719 439/578 |
| 2013/0291029 A1* | 10/2013 | Wells | H04L 12/2801 725/78 |
| 2014/0075468 A1 | 3/2014 | Lee et al. | |
| 2015/0304732 A1* | 10/2015 | Shapson | H04N 21/43615 725/149 |
| 2018/0020261 A1* | 1/2018 | Wachob | H04N 7/104 |
| 2020/0266911 A1 | 8/2020 | Fuller et al. | |
| 2020/0413490 A1 | 12/2020 | Palle et al. | |
| 2021/0119715 A1 | 4/2021 | Han et al. | |
| 2021/0176425 A1* | 6/2021 | Jones | H05K 5/0247 |

\* cited by examiner

HEADEND CONTROLLER AND METHOD OF USE

RELATED APPLICATION

This application is a non-provisional of and claims priority to U.S. provisional patent application Ser. No. 63/471,186 titled "Headend Controller and Method of Use" filed Jun. 5, 2023, which priority '186 application is incorporated by reference as if fully set forth herein.

FIELD OF THE DISCLOSURE

The disclosure relates generally to electrical signal processing, monitoring and distribution systems and methods executed by these systems. In particular, the disclosure relates to the processing, monitoring and distribution of Community Antenna Television (CATV) Radio Frequency (RF) signals through transmission mediums that may include coaxial cable, twisted pair, fiber optic cable and the like. This disclosure may further relate to an architecture and method of aggregating such RF signals from different sources having varying amplitude and/or slope. The disclosure provides techniques related to signal conditioning utilizing attenuation, amplification, and other means of passive and active filtering, signal monitoring, and the ability to make autonomous and manual adjustments on various discrete and aggregated inputs and outputs of the apparatus. The disclosure also relates generally to the field of combiners, amplifiers, and filters within CATV RF distribution systems.

BACKGROUND OF THE DISCLOSURE

This disclosure relates to systems and methods of an monitoring, signal apparatus that provide for the combining, analysis and signal conditioning of aggregated and discrete RF signals in a CATV system.

Modern CATV systems within large enterprise facilities commonly use an infrastructure of interconnected coaxial and fiber optic cables, splitters, amplifiers, filters, diplexers, and taps in addition to other signal conditioning apparatus to facilitate and distribute signals both "downstream" and "upstream" there through. A component of these distribution systems is the "headend" of a facility, referred to as the demarcation point which may be located within a facility telecom room. Signals containing various forms of media content are sent "downstream" from the headend to endpoint devices such as televisions, radios, "set-top-box" assemblies or other RF tuner devices to select and demodulate content. In applications, endpoint devices may be equipped with the capability to transmit signals "upstream" through the distribution system to the facility headend and/or to the signal provider's headend.

In many facilities, many source signals are aggregated to form signals that are be delivered to desired endpoints, whether from multiple systems operator (MSO) cable service/content providers, a satellite service provider, and/or locally generated media modulated within the facility headend.

A problem with multiple signal source systems is that the output amplitude of diversely sourced signals varies due to many factors including equipment as well as the external conditions of how signals are combined and/or delivered. Output amplitude problems can manifest regardless of whether a facility is utilizing a media distribution gateway providing QAM to QAM broadband media delivery or any other combination of aggregated signal distribution techniques. These issues can degrade signal quality.

In many CATV systems, there are many sources of signals to be directed to downstream destinations. Often, these signals are of varying amplitudes as well as some broadband "aggregated" signals which may also have positive or negative slope across their spectrum. When combining such signals, these amplitude variations pose an issue to overall signal quality preservation and distribution. Generally, before the signals from multiple sources are combined, a trained technician with appropriate tools (such as an RF signal meter) would individually evaluate and balance each of the discrete and aggregated signals by using various filters, attenuators, equalizers, and amplifiers to allow all signals to be combined with close to the same amplitudes and slopes across the entire spectrum.

FIG. 1 illustrates an example of a prior art CATV RF distribution setup in a typical headend of an enterprise facility.

A cable provider feed 100 is provided at the facility's demarcation point. The power level of this broadband signal will be measured and analyzed by the technician to make adjustments if needed. In some cases, this broadband signal from the provider will have a slope and that will need to be corrected manually by adding an equalizing filter 106 to flatten the signal. This flattened broadband signal is then amplified using a CATV distribution amplifier 108. This setup illustrates two additional clearQAM sources 102, 104 which have local content being generated at the facility. Examples of such content could be a local camera feed, a media player device, or digital information and signage content. Each of such local content sources may be provided at different power levels. These signals are measured and attenuated individually using a combination of coaxial attenuator pads 110. All the content sources are individually manually balanced so that all signals are at a same power level across all the active RF channels before being combined. While doing so, the technician will ensure that the signals do not overlap and are all separated in frequency appropriately. A traditional coaxial RF Power Combiner/Splitter 112 is then used to combine individually balanced signals. A coaxial RF Tap 114 is installed to provide a test point 116 to monitor and measure combined signals without interrupting service to the facility.

The combined RF signal is then split using an RF Power Combiner/Splitter 118 to distribute the signal to different locations within the facility. Depending on the distance from the demarcation point to different locations, the outputs of the RF power combiner/splitter 118 will be measured and adjusted further by the technician manually. Additional CATV distribution amplifiers 108 may be used at this stage to provide additional signal power to each location if needed. Technicians may install additional equalizing filters of different levels 120, 122 to add a positive slope to the signal before amplifying it. The values of equalizing filters need to be estimated manually based on the cable distance between the demarcation point and the individual locations. The individually balanced and adjusted CATV RF signals 124, 126, 128, 130 are then passed on to various facility locations.

Problems arise when signals vary over time for various reasons including changes in the launch amplitude from service providers or changes in their distribution system, hardware headend changes, as well as degradation over time of the RF modulators in locally generated signals.

These problems can lead to repeated technician service calls to diagnose and treat problems in the signal distribution system. This leads to service interruptions and additional maintenance costs.

In many such distribution systems, electrical signals are conveyed from a source to a receiver via electromagnetic waves in the radio-frequency spectrum. Electromagnetic signals may be conveyed by various transmission means, including physical transmission lines such as coaxial cables, fiber optic cables, and the like. In certain applications, electromagnetic signals are conveyed within a single bandwidth medium. In alternate applications, multiplexing is used to convey multiple electromagnetic signals. Multiplexing allows for the simultaneous transmission of multiple signals through a single transmission means by dividing the bandwidth of a communication medium into a series of non-overlapping frequency bands. Each band is used to carry a separate electromagnetic signal. This allows for a single transmission medium or line to carry multiple independent electromagnetic signals from a source to a receiver. Multiplexing may be used in different applications including AM and FM radio broadcasts, cable television signals, satellite signals, telephony systems, data transmission, cellular systems, and the like.

In certain applications, it is desirable to create an aggregated signal from multiple signals for distribution within a network. For instance, in enterprise facilities such as businesses, hotels, hospitals, retirement communities and the like may wish to provide an aggregated RF cable television signal for end users. Such an aggregated RF cable television signal may include signals from a combination of sources such as cable television signals (CATV signals), master antenna television signals (MATV signals), satellite master antenna signals (SATV signals), entity-created video content, and the like.

Particular problems arise in the distribution of such custom aggregated signals. Systems must be configured and balanced to establish appropriate signal quality. Changes from a content provider can create signal quality problems for a subscriber, including interference, contamination, and crosstalk between frequency bands and/or television channels.

Signal conveyance applications may utilize a headend controller system to receive signals from a source. Headend controllers allow for the conditioning of incoming signals for improved combination into an aggregated signal for distribution. Conditioning may include the balancing and configuration of signals for improved use. Specifically, headend controllers for cable television distribution systems may allow for the balancing and configuration of signals by standardizing the signal amplitude.

Existing methods of conditioning incoming signals is imperfect. Changes in signal over time from a source can render static conditioning settings obsolete and lead to unpredictable signal qualities. These problems can lead to repeated technician service calls to diagnose and treat signal distribution system problems. This leads to service interruptions and ongoing maintenance additional costs.

Thus, there is a need for an improved headend controller to facilitate the use and: maintenance of signal distribution systems, especially in television signal distribution systems.

SUMMARY OF THE DISCLOSURE

Disclosed herein is headend controller to facilitate the use and maintenance of signal distribution systems, especially in television signal distribution systems.

The disclosed headend controller resolves problems related to the distribution of unbalanced discrete and aggregated RF signals.

The disclosed headend controller further facilitates the proper installation, utilization, and management of a CATV RF signal distribution system.

The controller provides for the autonomous monitoring of CATV RF signal attributes. The controller further provides for the recording and storage of data regarding signal attributes for diagnostic purposes. If incoming signal attributes deviate beyond predetermined tolerance ranges, the controller can autonomously apply adjustments to correct the deviations, log events in a diagnostic database, and/or send an alert message to a service technician. Adjustments may include standardizing the signal amplitude and slope. The headend controller allows for the combination of different sets of signals from different sources to form a balanced, aggregated signal for use within a given signal distribution system.

In particular, this headend-based controller allows for the combination of different sets of cable television signals, over-the-air television signals, and other locally generated RF signals and their distribution within an enterprise facility or like closed network.

DETAILED DESCRIPTION

Figure 1:
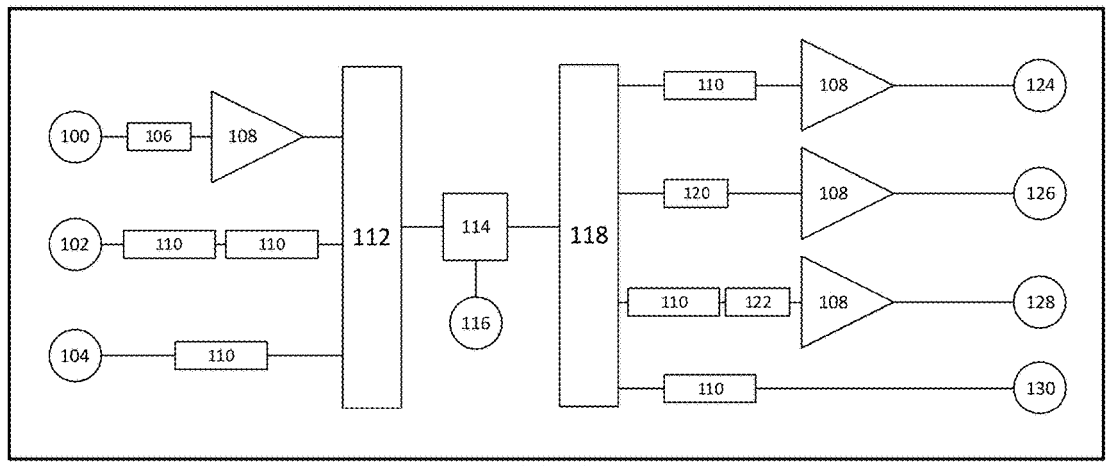
FIG. 1 is a representational view of a prior art CATV RF distribution system.
Figure 2:
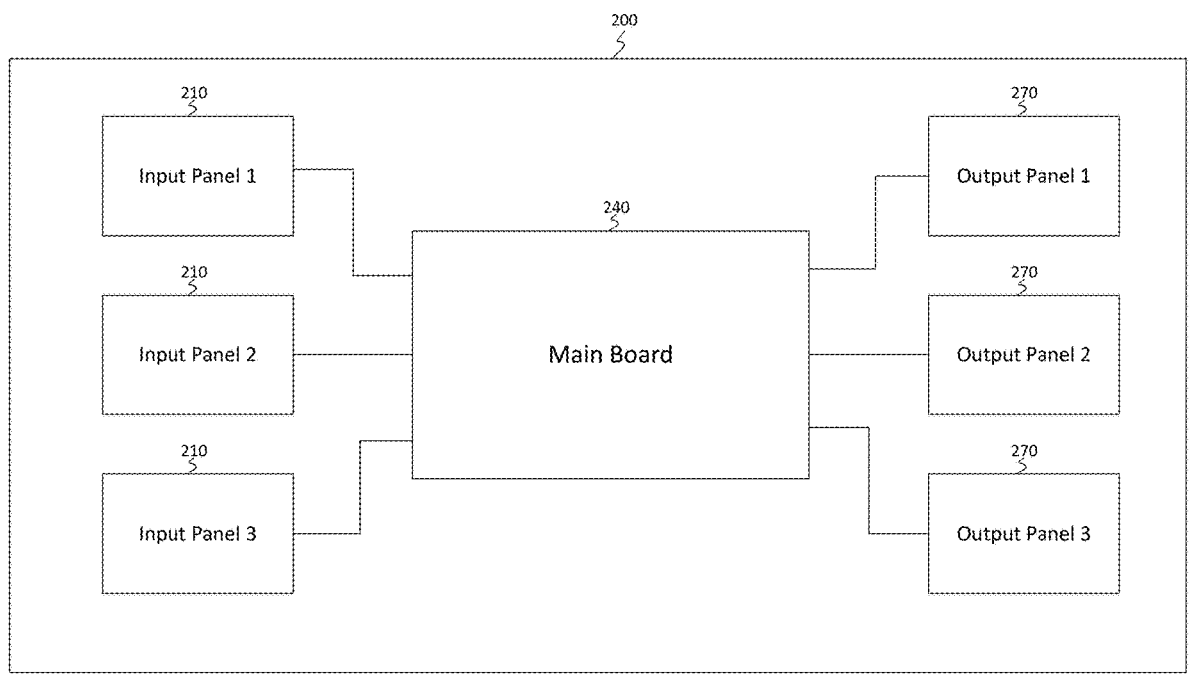
FIG. 2 is a representational view of the disclosed headend controller.

FIG. 2 provides a representational view of a headend controller 200 in accord with this disclosure.

Headend controller 200 provides signal conditioning for discrete and/or aggregated wideband RF signals.

In embodiments, headend controller 200 may be housed within a conventional, rack-mountable chassis enclosure.

Headend-based controller 200 includes several input panels 210, a main board 240 and several output panels 270.

Figure 3:
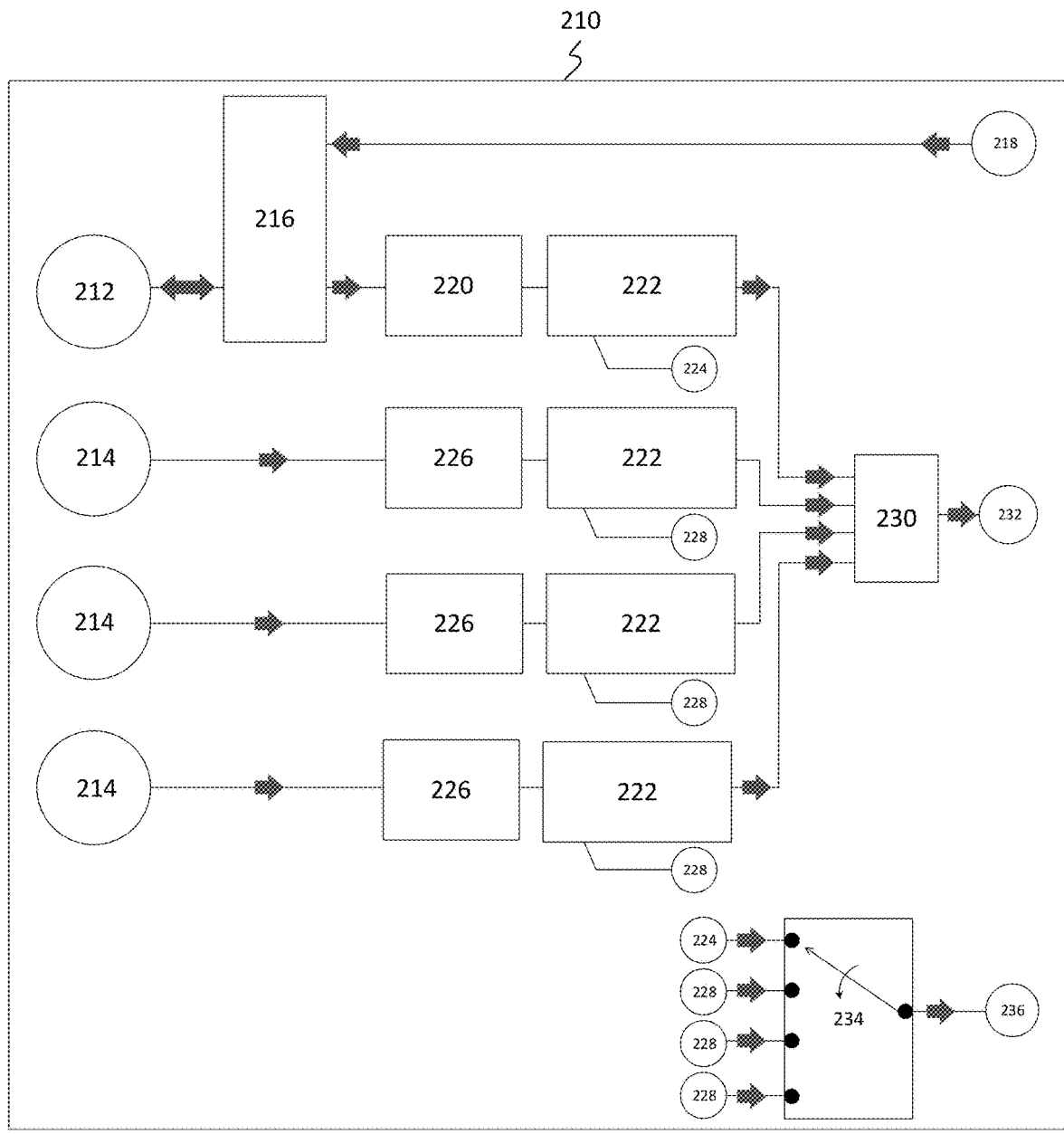
FIG. 3 is a representational view of a headend controller input panel.

As illustrated in FIG. 3, an input panel 210 may have input signal ports 212, 214 adapted to receive CATV RF signals to be conveyed downstream in the system. Signals including audio, video, and data content are conveyed downstream within a system from a headend or service provider to a system subscriber or system endpoint.

In addition to downstream CATV RF signals, in system embodiments input signal ports 212 can process upstream traveling RF signals if desired. Upstream signals conveyed from a system subscriber or system endpoint back to the headed or service provider. Upstream signals may include data transmissions such as user requests for on-demand content, user interactions for interactive services, or uploaded user-generated content.

Main board 240 houses components to allow for signal conditioning across the system's input and output panels. These components include system control unit 256, RF signal analysis block 248 and additional main board signal conditioning element 242, 258. Main board 240 may also supply power to the input and output panels.

Output panels 270 allow for the multiple copies of the conditioned and aggregated input signals to be re-distributed using output signal ports 280 each of which can be adjusted according to user requirements.

Input ports 212, 214 are adapted to receive discrete and/or aggregated downstream CATV RF signals. While four input ports 212, 214 are shown for every input panel 210 in the attached FIG. 3, in alternate embodiments, controller 200 may have a different number and/or type of inputs.

In further embodiments, input ports 214 may be adapted to receive video sources including but not limited to RF and Audio over fiber, IPTV HDMI, streams, component, and composite baseband video sources.

In embodiments wherein controller 200 is adapted to receive different types of RF video signals, input ports 212, 214 may be adapted to receive broadband RF signals such as cable television signals (CATV signals), master antenna television signals (MATV signals), satellite master antenna (SATV signals) and the like.

Each input panel 210 has a dedicated RF directional coupler 222 for each input port. An identical directional coupler may be located in the main board 240.

Each directional coupler 222 allows for measuring various attributes of incoming RF signals joined to inputs 212, 214 and the main board 240 via the directional coupler's coupled port, also referred to as a test port. These coupled signals 224, 228, 244 allow for sampling the incoming RF signals without interrupting the main RF signal flow.

Monitored attributes of discrete and/or aggregated RF channels may include RF signal amplitude, the positive or negative slope or tilt given frequency band or span, and other signal attributes such as modulation characteristics such SNR (Signal to Noise Ratio), MER (Modulation Error Ratio), C/N (Carrier Noise), BER (Bit Error Rate) and the like. Signal monitoring may be achieved through the use of various devices including an RF selector switches 234 located on both the input panels and main board 240, and RF signal analysis circuitry 248. The RF selector switches are controlled individually by system control unit 256. This allows the system to discretely monitor the coupled port outputs of each directional coupler 222 located on the input panels and main board.

In CATV signal distribution applications, the monitoring of signal attributes can help maintain signal quality to ensure improved performance. Signal monitoring can be achieved using various sensors such as a conventional CATV tuner or a combination of components such as a frequency synthesizer, an RF mixer, and a bandpass filter. These components work together to isolate and evaluate selected RF frequencies. Following the isolation of the desired RF frequency, an RF log detector may be employed to measure the amplitude of selected channels. These elements may be included within RF signal analysis block 248. A monitored signal may be presented to RF signal analysis block 248 for channelized amplitude evaluation including but not limited to the evaluation of potential channel duplication and overlap.

In other embodiments, integrated circuit (IC) based systems having demodulators may be used to evaluate signals and calculate signal Modulation Error Ratios (MER), pre and post-Bit Error Rates (BER) as well as Carrier Noise for analog television signals.

Each directional coupler 222 in input panel 210 and main board 240 is preceded by a downstream RF signal conditioning element 220, 226, 242 having the capacity to treat CATV RF signals. Treatment steps executed by these conditioning elements may include signal amplification, signal attenuation, signal equalization to apply varying degrees of positive slope, and cable simulation to apply varying degrees of negative slope.

Figure 6:
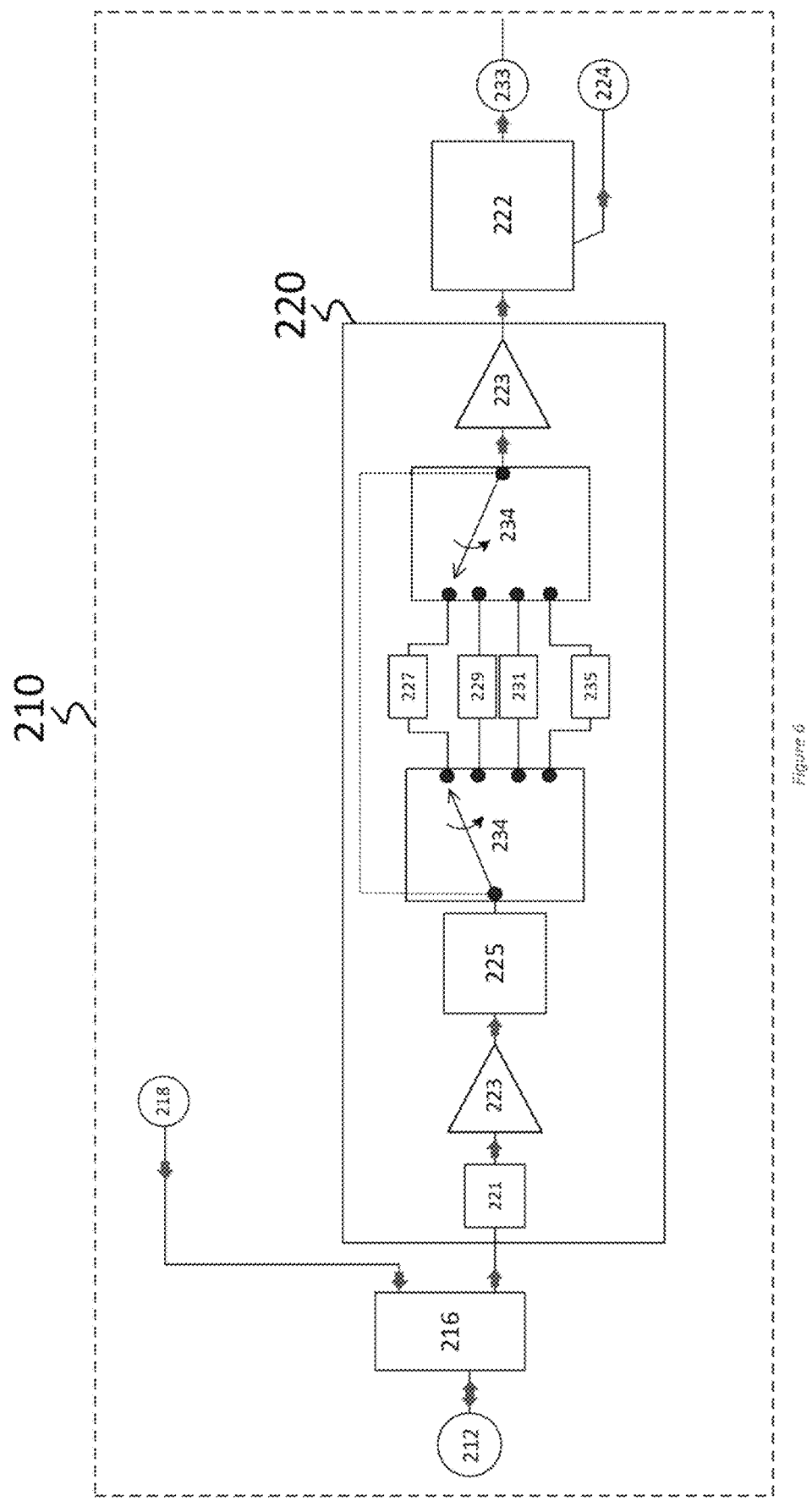
FIG. 6 is a representational view of an input panel signal conditioning element.

A representational diagram disclosing signal conditioning element 220 is shown in FIG. 6. A CATV RF signal travels downstream from input port 212 to diplexer 216. The signal is filtered through diplexer 216 and then passed through an RF protector circuit 221. Circuit 221 offers board-level protection by clamping the input signals at a higher limit of ~54 dBmV. The downstream flowing signals are then passed through an RF gain block 223 with a bypass path if initial amplification is not needed.

The signals then pass through a variable step RF attenuator 225. The attenuation variable for the attenuator block 225 and the need to pre-amplify the signal using the gain block 223 is determined by system control unit 256 after the signal is initially evaluated.

During the signal evaluation stage, the attenuation is set to a default minimum value. The attenuation value is later adjusted based on the user requirements and as determined by the system control unit 256.

The attenuation adjusted RF signal is now forwarded to one of the four signal conditioning paths 227, 229, 231, 235. Each signal conditioning paths allows system controls unit 256 to apply equalization 229, cable simulation filters 231, 235 or allow an unmodified pass-through path 227 without any signal adjustment.

The signal conditioning paths are set using RF selector switches 234 which are controlled by system control unit 256. After passing through a signal conditioning path, the RF signal is progressed to RF gain block 223. The RF gain block 223 also has a bypass mode if no signal amplification is needed. The RF signal is then passed to an RF direction coupler 222 where a sample of signal is passed to the coupled port 224 of the directional coupler. The main RF signal is passed to the rest of the input panel section via the output port 233 of the directional coupler.

Figure 7:
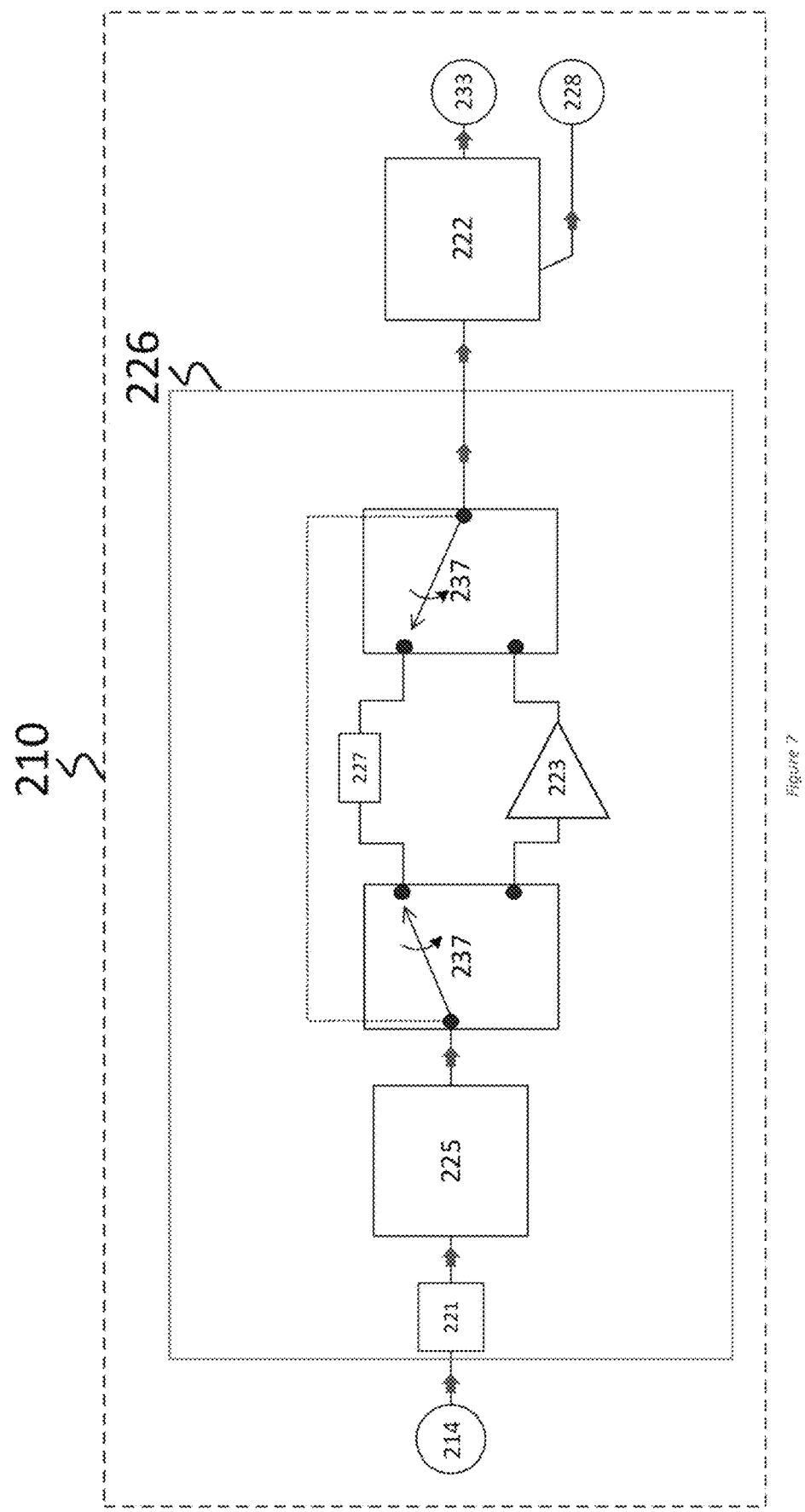
FIG. 7 is a representational view of an alternate embodiment input panel signal conditioning element.

An alternate embodiment signal conditioning element 226 is shown in FIG. 7. Element 226 may be used for CATV RF signals which do not require any slope adjustment and/or in systems that do not require the upstream transmission of signals.

In use of conditioning element 226, an RF signal first passes through an RF protector circuit 221 to clamp any high power input signals. The signal then passes through a variable step RF attenuator 225 whose attenuation variable is set by the system control unit 256, similar to use of signal conditioning element 220. If the RF signal is measured at a lower power level using the directional coupler 222 coupled port 228, then the signal passes through the gain block 223.

Alternatively, if RF signal power levels are adequate, then the signal passes through the signal pass-through path 227.

After passing through the signal conditioning elements 220, 226, input signals are forwarded to an RF Power Combiner 230.

As shown in FIG. 3, conditioned signals from input ports 212, 214 of an input panel 210 are then aggregated using an RF power combiner/splitter 230 to form a combined CATV RF stream 232 from the entire input panel.

Figure 4:
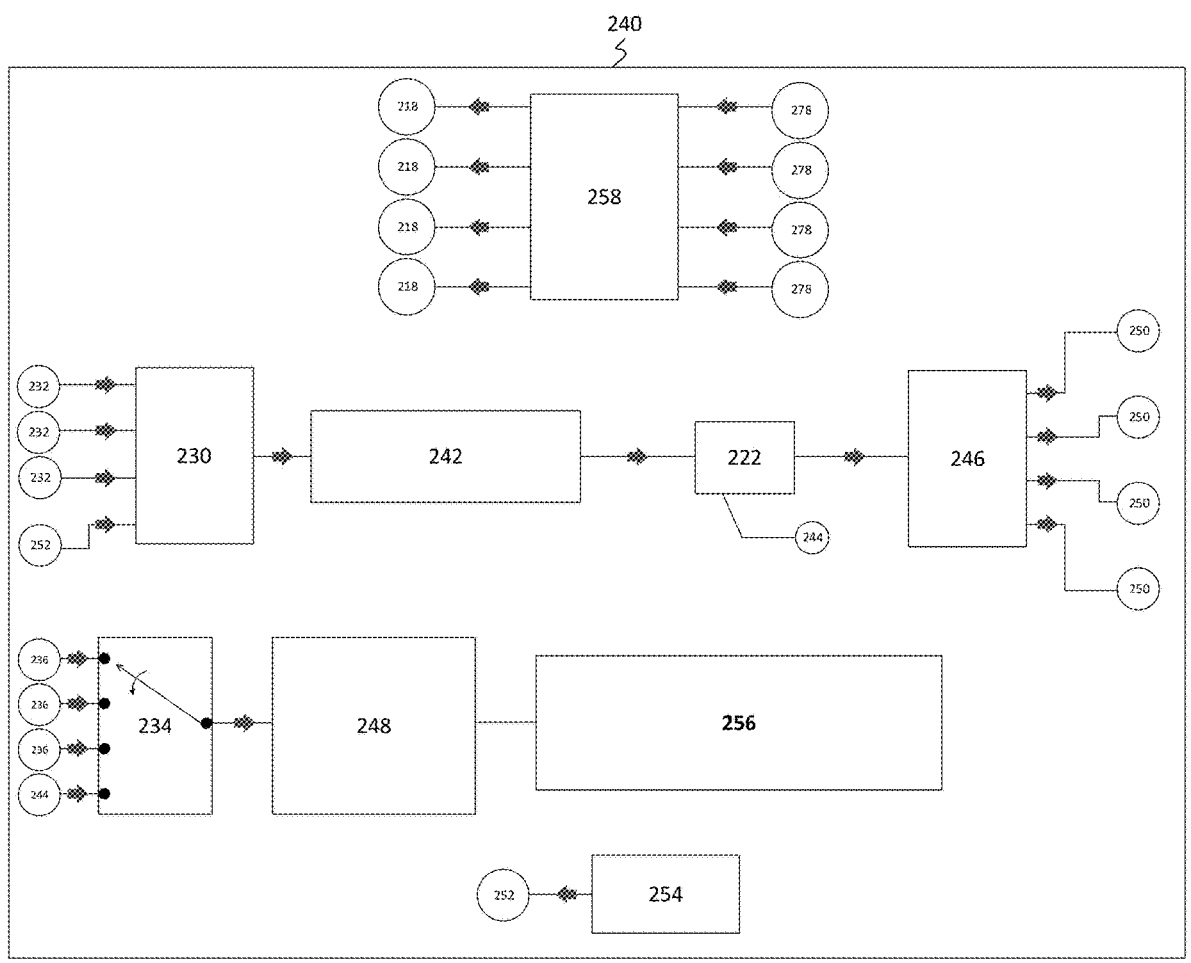
FIG. 4 is a representational view of a headend controller main board.

Combined RF streams 232 from each input panel 210 are forwarded to main board 240 RF combiner module 230 where they may be combined with an optional RF signal 252 generated by an RF transceiver circuit 254. See FIG. 4. This aggregated RF stream from all the input panels is then passed through additional signal conditioning element 242 on main board 240. This signal conditioning element may be similar to conditioning element 226 shown in FIG. 7.

Signal conditioning element 242 may be set to default values so that a signal is passed to the main board RF direction coupler 222. RF direction coupler 222 includes a test port 244 to allow for the evaluation of a final aggregated RF stream by system control unit 256. If an evaluation determines that the signal should be additionally conditioned, the signal conditioning element 242 is used to apply the required changes to the aggregated stream. These changes may include signal attenuation, equalization, and After this amplification. After this process, the aggregate stream is then passed to an RF power divider/splitter 246.

RF power divider/splitter 246 is capable of sending duplicate copies of the combined aggregated RF stream formed at signal combiner 230 and later signal conditioned in 242. In CATV distribution applications, signal combiner 230 and signal splitter 246 may be a conventional RF power splitter/divider/combiner element.

Figure 5:
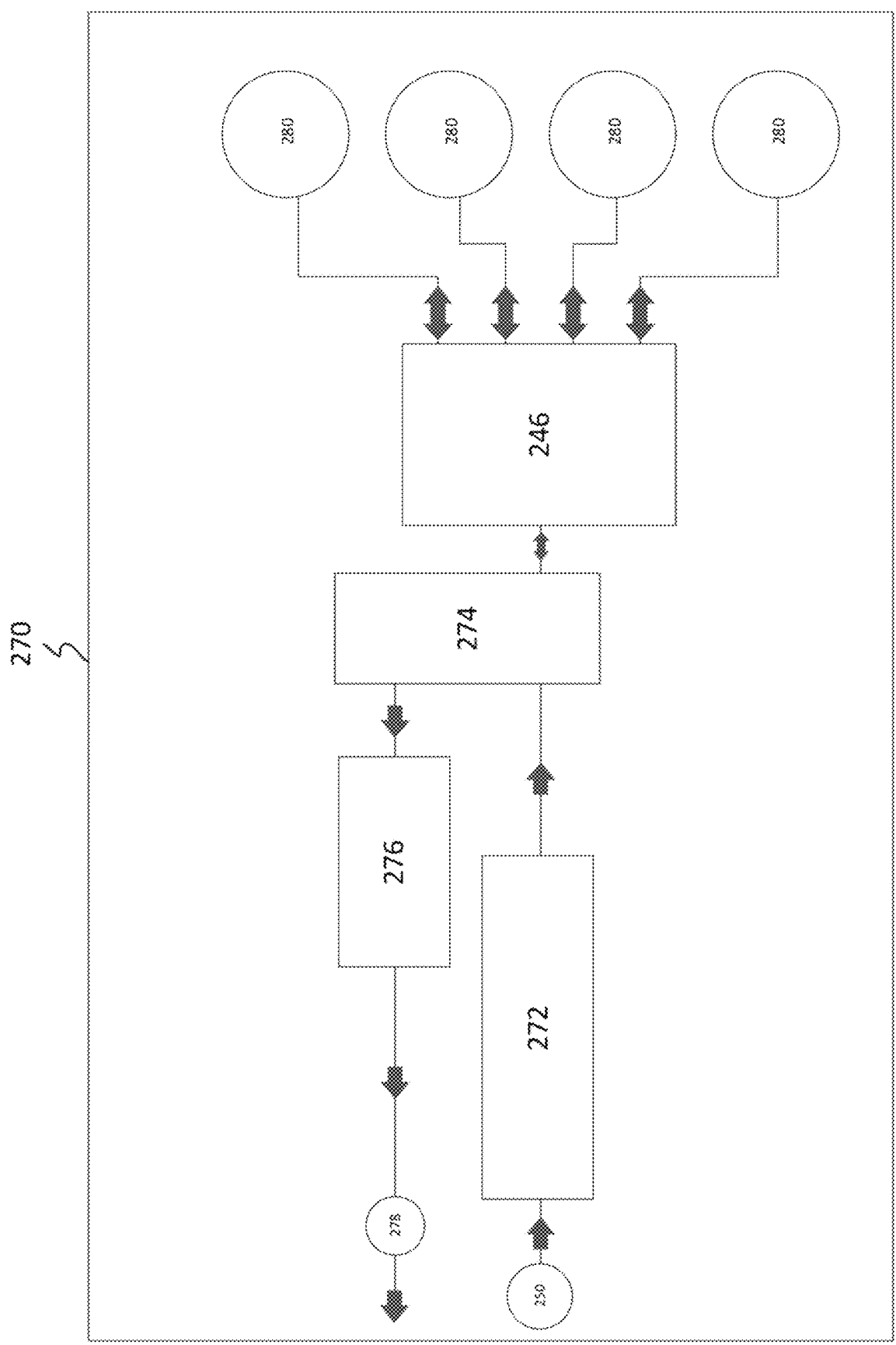
FIG. 5 is a representational view of a headend controller output panel.

Each of the duplicate signal copy 250 is forwarded the output panels 270 as shown in FIG. 5. Depending on the requirements set on each of the output panels 270, the copies of the signal 250 can be further conditioned. Each output signal conditioning element 272 can treat RF signals in a manner similar to a conditioning element 220, 226, 242 as described above, focusing on signal attenuation, equalization, and amplification. The conditioned output signal is further split into multiple copies by the RF power divider/splitter block 246 to present identical output signals to every output port 280.

While four output ports 280 are shown in the attached Figure per every output panel 270, other embodiments of controller 200 have a different number of output ports 280.

In CATV RF signal distribution applications, user endpoints and CATV RF feed sources may use a single transmission medium to share signals transmitted downstream and upstream through a facility infrastructure. In the disclosed system 200, RF diplexers 216, 274 are used to separate or combine upstream signals and downstream signals through headend controller 200. Diplexers 216, 274 may be a three port device having a common port, a low-pass port and a high-pass port. The common port is used for a combined signal containing downstream and upstream signals. The low-pass filter port may only pass upstream signals and the high-pass filter port may only pass downstream signals.

Return path signals traveling upstream from endpoint sources will pass from bi-directional ports 280 on the output panel 270, to RF Power Combiner/Splitter 246 and to the common port of RF diplexer 274. The return path signals will then pass through the low-pass filter port of RF Diplexer 274 and to the signal upstream signal conditioning 276 and to return path port 278 of output panel 270. The return path signals will then pass to the main board return path signal combiner, conditioner and splitter group 258 to main board return path output ports 218. Return path signals are then passed to the input panel's return path ports 218 to the input panel's RF diplexer's 216 low pass port and out the common port of the RF diplexer to then exit out of the input port 212 while simultaneously allowing downstream signals to pass through using the same pathway.

System control unit 256 controls the elements making up the controller 200 and may also include a programmable logic controller, processor, and various forms of volatile and non-volatile memory.

System control unit 256 has the capacity to store RF signal attribute data from directional couplers 222 located on input panels and main board for later diagnostic review. In embodiments, the system control unit 256 may include the capacity to generate alert messages when certain signal quality issues arise. Such alert messages may be transmitted to diagnostic and technical staff as needed. Alert messages may include information transmitted by-email, by phone or other mediums.

The use of headend-based controller 200 will now be described.

Figure 10:
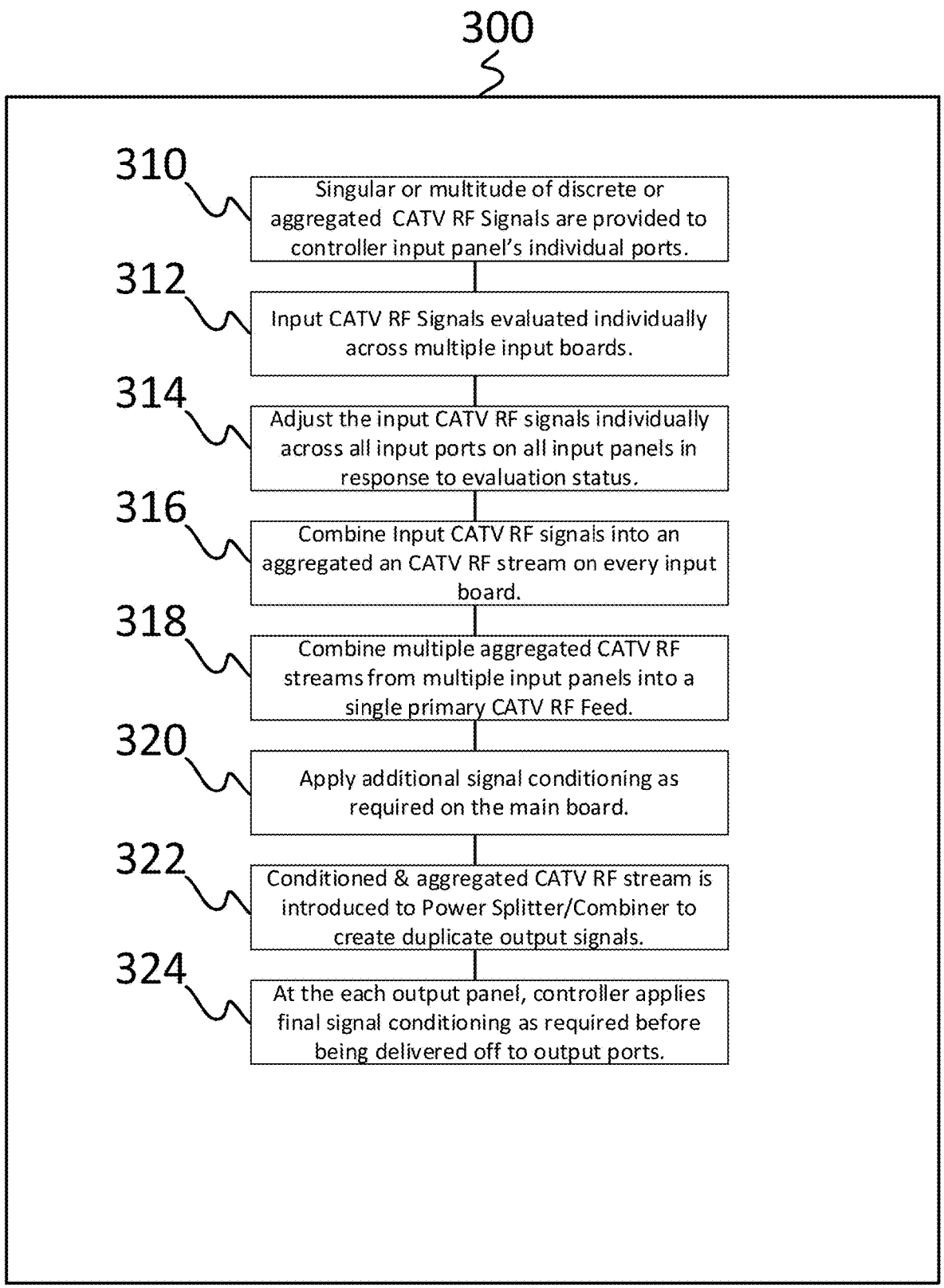
FIG. 10 illustrates a flowchart 300 disclosing steps in a method of processing downstream signal flow.

FIG. 10 flow chart 300 broadly illustrates the use of a controller 200 adapted to receive different types of CATV RF signals.

At step 310, discreet or aggregated groups of input CATV RF signals/RF channels are provided to each of the input ports 212, 214 of an input panel 210. Input sources for such RF signals could be from a utility trunk line or drop cable, over-the-air antenna, satellite feed, or other broadband RF signal sources.

At step 312, each input CATV RF signal provided to controller 200 is passed through its input port directional coupler 222 which samples a portion of this input signal without interrupting the main RF path using its coupled port 224, 228 and this couple port signal is then evaluated by the RF signal analysis circuitry 248.

Evaluation data from 248 is recorded at system control unit 256.

At step 314, each input CATV RF signal is conditioned by one or more conditioning elements 220, 226. Specific conditioning steps are executed in response to the status of each discrete or aggregated group of signals as determined by signal analysis circuitry 248 and evaluation and comparison of all signals from all ports by the system control unit 256. This evaluation process is discussed in detail later in the flow chart 400.

At step 316, the conditioned input CATV RF input signals are aggregated into a single RF stream at input panel's RF Power Combiner 230.

At step 318, a typical embodiment of the device is shown having an additional RF power combiner 230 on the main board illustrated receiving the conditioned and aggregated input CATV RF signals 232 from several input panels and an optional injected RF signal 252.

At step 320, additional signal conditioning 242 is applied in response to the evaluation of the aggregated stream sampled 244 from main board's RF Directional coupler 222, further adjusting the aggregated RF stream as required, determined by RF signal evaluation circuitry 248 and system control unit 256.

At step 322, the aggregated RF signals are introduced to another RF Power Splitter 246 to equally divide the signal to multiple copies 250 to distribute them to the output panels 270.

At step 324, the downstream RF signals 250 will have their final signal conditioning applied 272 on the output panels 270 as required by the system control module and user input parameters. These downstream signals will pass through the high pass side of an RF diplexer 274, and be presented to an RF power combiner/splitter block 246 which splits the signal again into multiple identical copies to pass to the output ports 280 of controller 200.

In a typical embodiment of controller 200, an output port 280 would typically be an RF coaxial connector or single-mode fiber optic transmission medium.

An RF signal analysis process for CATV RF signals passing downstream through controller 200 will now be described. See FIGS. 11 and 12 in view of FIG. 3 through 8.

Figure 11:
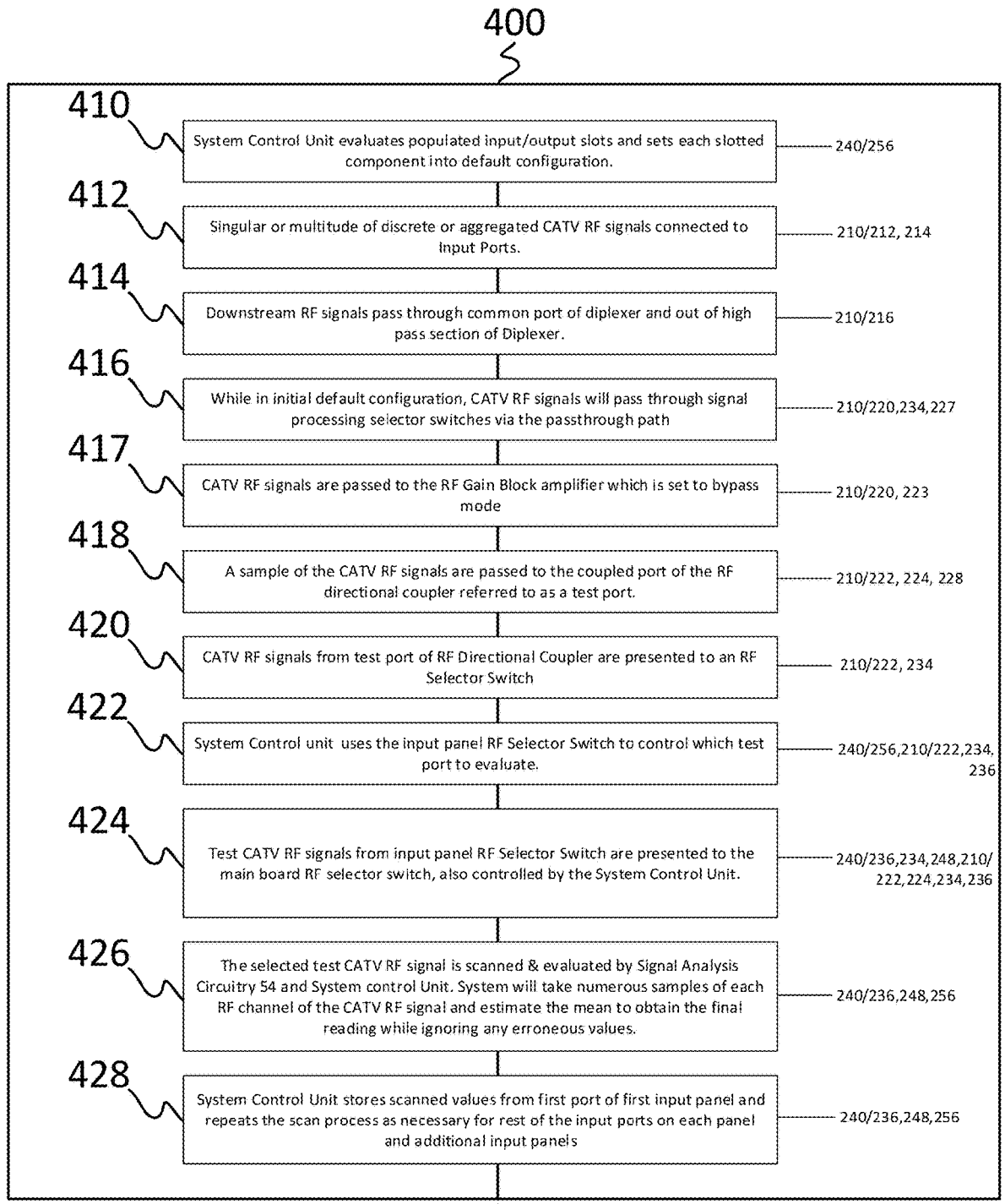
FIG. 11 illustrates a flowchart 400 disclosing a method of processing downstream signal flow.

FIG. 11 flow chart 400 illustrates the method used by the controller 200 to evaluate, analyze, and adjust wideband downstream CATV RF signals which are fed into the input ports 212, 214 through the use of signal conditioning circuitry 220, 226 on each input panel 210 through sampling of downstream CATV RF signals with an RF Directional Coupler 222.

At step 410, system control unit 256 establishes communication with the populated input panels 210 and output panels 270, and any additional populated hardware defined in future embodiments of the controller 200.

After detecting the panels connected, the system control unit may load default configuration settings into the panels and then gets the system ready for signal analysis. The panel information is presented to the user in a graphical user interface accessible via a LAN connection from the controller to a separate diagnostic computer.

At step 412, singular and/or a multitude of discrete and/or aggregated wideband CATV RF signals are introduced into input ports 212, 214. The input CATV RF signals can be of varying amplitudes and slopes as illustrated in FIG. 8.

Figure 8:
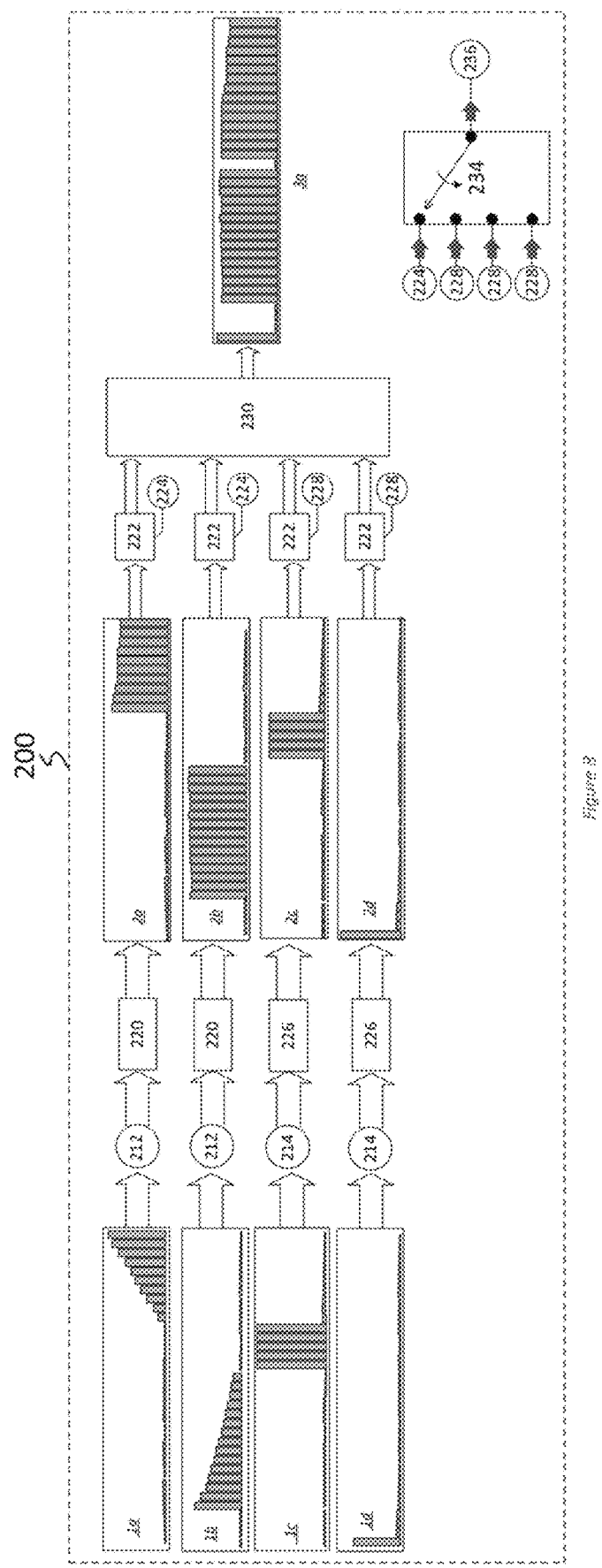
FIG. 8 illustrates the process of balancing four different CATV RF signals at an input panel.

FIG. 8 illustrates four ports on an alternate embodiment input panel 210 which contains two input ports with slope control 212 and two input ports which do not have slope control option 214 as part of their signal conditioning elements 220, 226.

In this illustration, the 1a aggregated group of ten wideband CATV RF signals/RF channels having observed aggressive positive slope, when distributed through a conventional CATV distribution system, can generate intermodulation distortion, amplifier non-linearities, gain variations in the form of frequency-dependent amplification, in addition to decreased Signal to Noise Ratio (SNR).

Alternatively, the 1b aggregated group of wideband RF signals/RF channels having negative slope may pose problem along with signal integrity degradation when such a signal is amplified and distributed.

The 1c group of five aggregated wideband RF signals lack a noticeable degree of slope; however, the overall amplitude of these signals is greater than desired.

The 1d group showing a single discrete wideband RF signal has an amplitude that is lower than desired.

At step 414, each input wideband RF signal 212 which requires slope control enters the RF diplexer 216 and passes through the high pass side to the signal conditioning circuitry 220. Input signals 214 which do not require slope control are passed directly to their signal conditioning circuitry 226.

At step 416, while in initial default configuration upon startup, system control unit 256 configures all components of the controller 200 to a pass-through mode and the system control unit 256 sets the RF Selector Switches 234 to pass incoming wideband RF signals through a passive pass-through section 227 of the signal conditioning block 220, 226 as shown in FIG. 6 and FIG. 7.

At step 417, the wideband input CATV RF signals are passed to both the RF gain blocks 223 which have been configured to bypass mode by the system control unit 256 during initial startup configuration.

At step 418, the input CATV RF signals are then passed to the input port of RF directional couplers 222 located on each of the four input legs of the input panel 210, where a reduced amplitude signal is passed through the coupled/test port 224, 228 of the RF Directional Coupler 222.

At step 420, the sampled input RF signals from the test ports 224, 228 of the RF directional couplers 222 are presented to the input panel's RF Selector Switch 234.

At step 422, the control unit 256 will select one individual test port's sampled signal to present to the main board. The system control unit 256 distinguishes each input panel 210, and each input port 212, 214 as unique entities, storing and evaluating the data collected from the RF signal analysis circuitry in 248.

At step 424, sampled RF signals 236 from each input panel 210 are then presented to the main board's RF selector switch in 234, also controlled by the system control unit 256.

At step 426, the full spectrum of input signal from 1a is scanned and evaluated by the system control unit 256 using the signal evaluation circuit in 248, discarding signals below the default or user-defined thresholds, and storing signals within default or user-defined ranges. The system control unit 256 may not immediately make any signal conditioning changes in response to the analysis performed on the input signal from 1a, but instead will proceed to evaluate additional inputs 1b, 1c, and 1d.

Once all the input ports 212, 214 are scanned, the system control unit 256 creates a calculated image of the best-conditioned mode for all input ports once aggregated into a single broadband spectrum. By doing so it ensures that signals from all the input ports are balanced and combined at the same level so the resulting aggregated signal is relatively flat across the entire spectrum with active frequencies.

At step 428, the system control unit 256 stores values from the first port 212 of the first input panel and repeats the process as necessary for additional input ports for each of the input panels 210.

At step 430, the system control unit 256 calculates and compares scanned and stored data to determine appropriate signal conditioning parameters for each input port on each input panel based on default and user-provided requirements.

At step 432, the system control unit 256 repeats the scan process of all input ports for each input panel and ensures calculated adjustments are realized. It is also at this stage where the system control unit will evaluate for duplicate RF Channels between populated ports of populated panels. If the desired values are outside of the capability of controller 200, or if duplicates exist on the inputs 212, 214, then the system will generate an alert to the user.

At step 434, conditioned CATV RF Signals that pass through the output port 233 of the input panel RF Directional Couplers 222 as illustrated in the FIG. 6 and FIG. 7 get aggregated using an RF Power Combiner 230 of the input panel, and the aggregated input RF stream 232 is then passed to the main board RF Power Combiner 230, which combines all aggregated RF inputs from all sources from multiple input panels into the primary system feed. Alongside these aggregated input RF signals 232, the main board RF power combiner 230 also combines in an optional RF signal 252 alongside the CATV RF stream which is injected by an RF transceiver 254.

At step 436, the aggregated CATV RF feed from all input panels is then passed through additional main board signal conditioning element 242 and then to the main board RF directional coupler 222, whose coupled port/test port's 244 data is evaluated by the system control unit 256 to ensure that the final aggregated CATV RF feed is still within the user-defined specification. If not, additional signal conditioning is performed at the main board conditioning element 242. The resulting conditioned and aggregated CATV RF feed is passed to the main board RF power combiner/splitter 246.

At step 438, the main board RF power combiner/splitter 246 splits the aggregated CATV RF feed into multiple identical copies 250 which are passed to each of the output panel 270.

At step 439, the copies of the RF feed from the main board 250 on the output panel 270 can be further conditioned at the conditioning element 272 and split further into more multiple copies using the final output panel RF power combiner/splitter 246 as per user-set requirements on the output ports 280. In some embodiments of the output panels, the user can set the output amplitude on each of the output ports to be as high as 40 dBmV with a positive slope and certain embodiments of output panels can be set to be at a lower level with a flat power level of 20 dBmV.

At step 440, based on predefined configurations and user-defined requirements, the system control unit 256 autonomously continues to poll, scan, and evaluate signals from every input panel's test ports 224, 228, and the main board's test port 244 at regular intervals. It ensures that signal levels are within specified ranges, adjusting signal conditioning parameters as necessary. In cases where input CATV RF signals deviate beyond the hardware's correction capabilities, the system is equipped to issue messaging alerts via various communication channels, including IP-based webmail servers. These alerts are triggered by predefined thresholds or abnormal signal conditions, ensuring timely response to signal anomalies.

Figure 9:
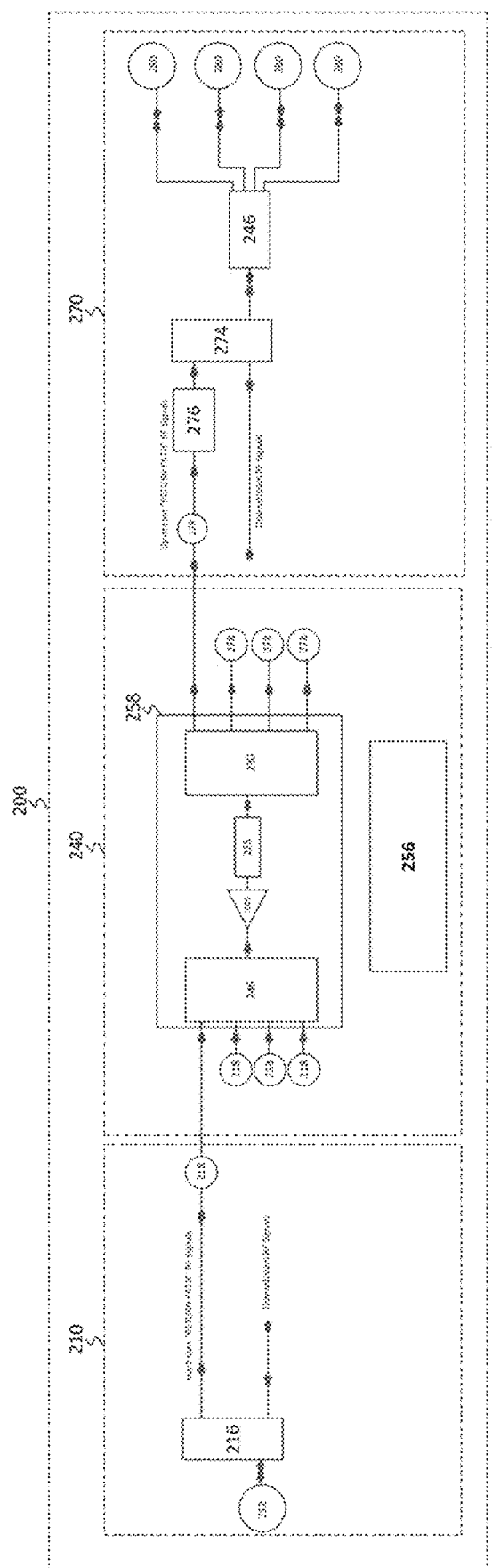
FIG. 9 is a representational view illustrating signal flow through the controller.
Figure 12:
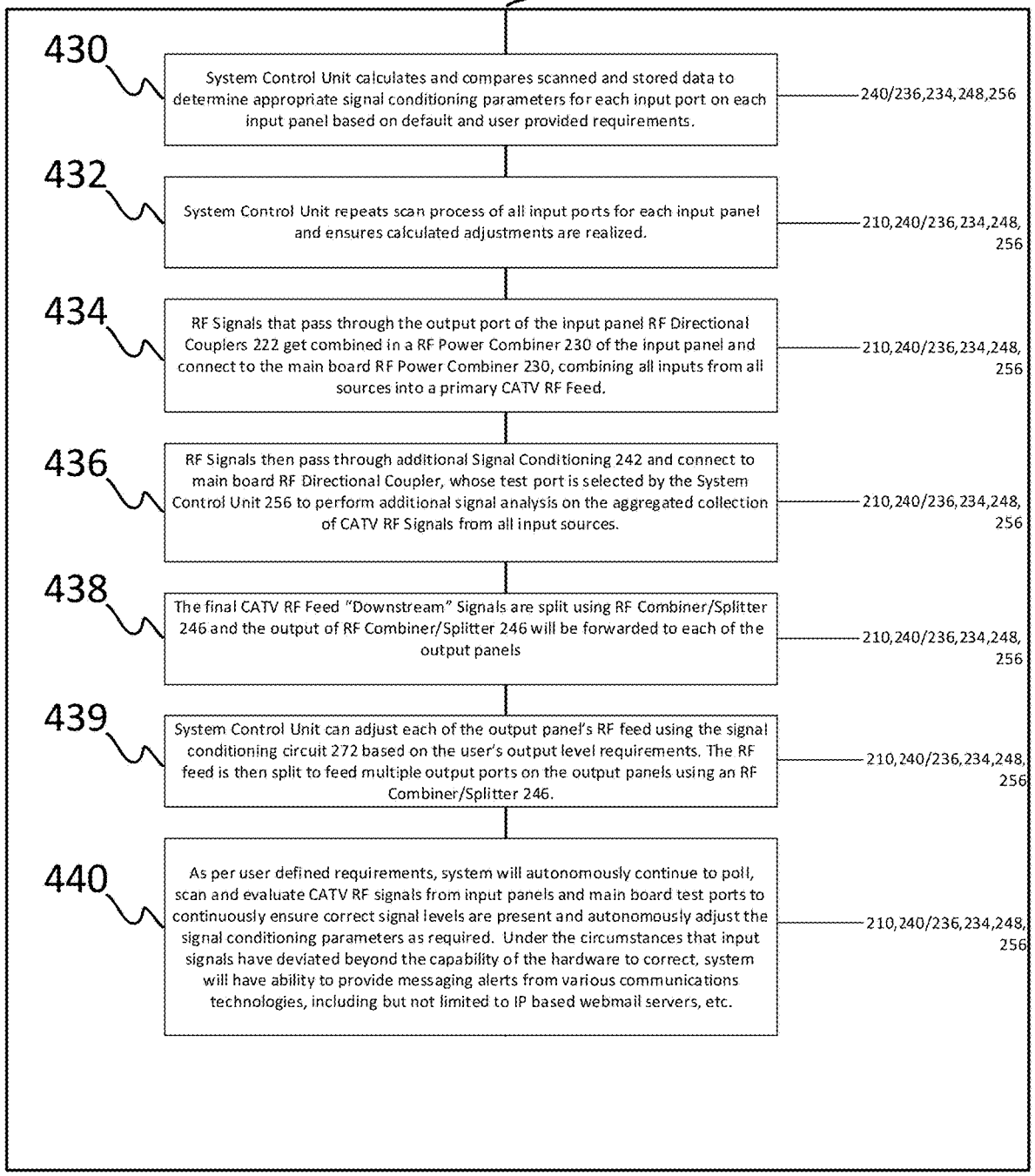
FIG. 12 illustrates a further steps of flowchart 400 disclosing a method of processing downstream signal flow.
Figure 13:
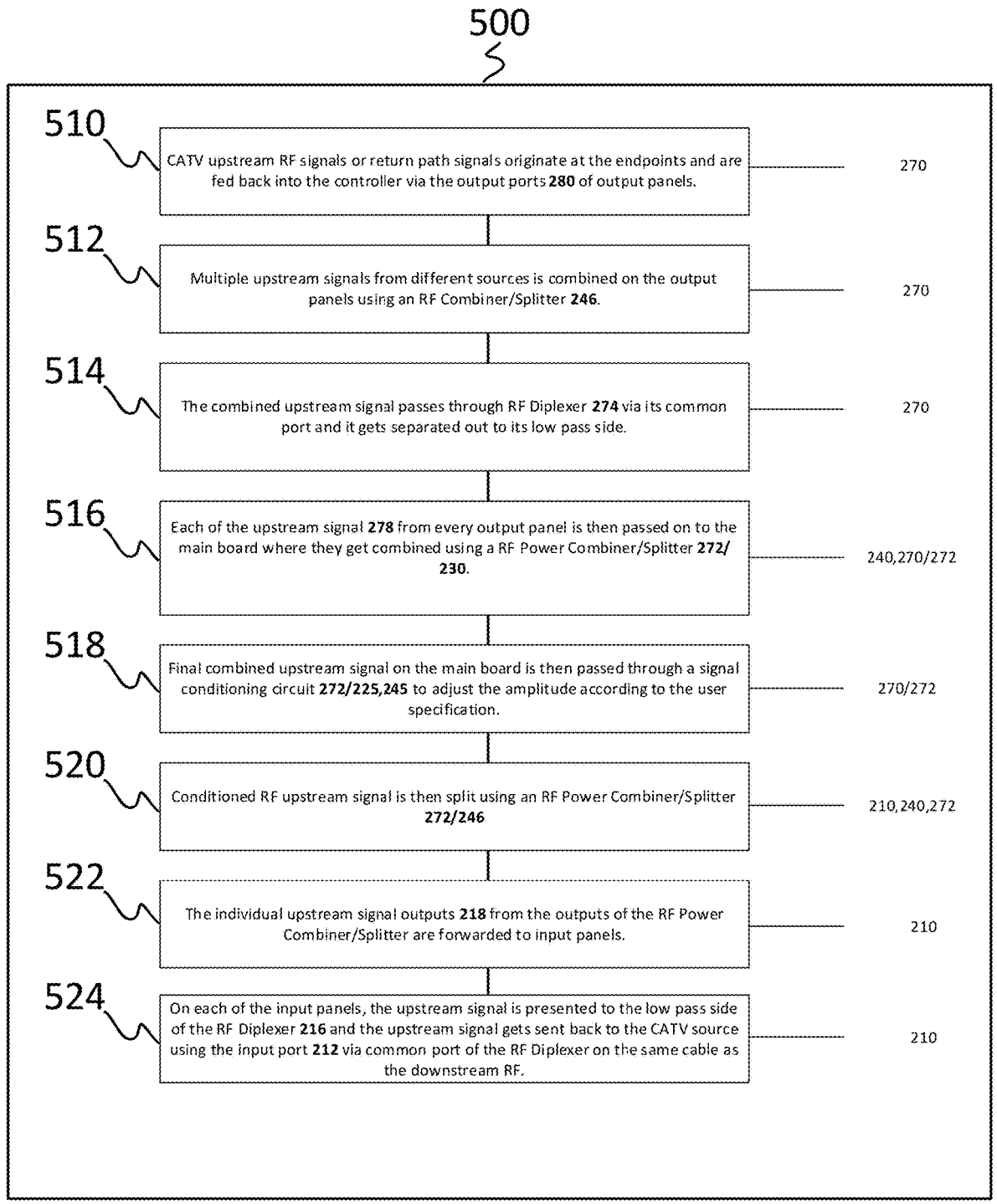
FIG. 13 illustrates a flowchart 500 disclosing steps in a method of processing upstream signal flow.

FIG. 9 illustrates the RF signal flow of an upstream signal from an endpoint connected to the controller going back to the intended input source. FIG. 12—Flowchart 500 lists the sequence of steps in this signal flow. See FIG. 12 within view of FIG. 3 through FIG. 9 to properly follow the references listed in the steps below.

At step 510, the upstream CATV RF signals also referred to as return path signals originate at the endpoints which are connected to the output ports 280 of the output panels 270.

At step 512, multiple upstream CATV RF signals from multiple output ports 280 are combined at the output panel RF power combiner/splitter 246.

At step 514, the output of the output panel RF power combiner/splitter 246 is then passed to the common port of the RF diplexer 274. The upstream signal gets separated by the diplexer and is then passed out via the low pass side. The low pass side is connected to an optional signal conditioning 276 which is controlled by the system control unit 256.

At step 516, the conditioned and aggregated upstream signals from each of the output panels 278 are passed to the main board where they all get combined using the main board's upstream RF power combiner 230 in the signal conditioning element 258.

At step 518, the final combined upstream signal is then passed through additional signal conditioning elements 245, 225 as needed on the main board. The components in these conditioning elements are specified to operate at the lower frequencies as required by the upstream signals.

At step 520, the conditioned RF upstream signal is split into multiple identical copies 218 using an upstream main board RF power combiner/splitter in 246.

At step 522, the outputs of the RF power combiner/splitter 218 are then forwarded to each of the input panels.

At step 524, the upstream RF signals from the main board are directed to the input panel RF Diplexer 216 in each of the input panels via its low pass side. The RF diplexer 216 then puts the upstream alongside the downstream and pass it through the common port and this combined signal is then directed back to the input ports 212 which then gets sent back to the input source connected to that input port.

While this disclosure includes one or more illustrative embodiments described in detail, it is understood that one or more embodiments are each capable of modification and that the scope of this disclosure is not limited to the precise details set forth herein but include such modifications that would be obvious to a person of ordinary skill in the relevant art including, but not limited to, changes in material selection, size, operating ranges, environment of use, and the like, as well as such changes and alterations that fall within the purview of the disclosure and the following claims.

What is claimed is:

1. A method for the distribution of CATV RF signals comprising the steps of:
  A. Providing a headend controller, said headend controller comprising one or more of input ports, a system control unit and one or more output ports;
  B. Providing CATV RF signals to said one or more input ports;
  C. Evaluating each said CATV RF signal to collect input signal evaluation data corresponding to each said CATV RF signal, said input signal evaluation data comprising CATV RF signal power and CATV RF signal slope data;
  D. Recording each said input signal evaluation data corresponding to each said CATV RF signal at said system control unit;
  E. Comparing each said input signal evaluation data against system predetermined input signal range values, said predetermined signal range values comprising CATV RF signal power range values and CATV RF signal slope range values;
  F. Determining whether said input signal evaluation data falls outside of said predetermined input signal range values for each said CATV RF signal;
  G. Applying signal conditioning to each said CATV RF signal having input signal evaluation data outside of said system predetermined input signal range values; and
  H. Aggregating each said CATV RF signals into a combined CATV RF signal stream;
  I. Evaluating said combined CATV RF signal stream to collect signal stream evaluation data corresponding to said CATV RF signal stream, said signal stream evaluation data comprising CATV RF signal power and CATV RF signal slope;
  J. Recording said signal stream evaluation data at said system control unit;
  K. Comparing each said signal stream evaluation data against predetermined signal stream range values comprising signal stream power range values and signal stream slope range values;

L. Determining whether said signal stream evaluation data falls outside of said predetermined signal stream range;
M. Applying signal stream conditioning to CATV RF signal stream if said signal stream evaluation data falls outside of said predetermined signal stream range; and
N. Providing said CATV RF signal stream to said output port.

2. The method of claim 1 wherein step C comprises sampling each said CATV RF signal with an input port directional coupler.

3. The method of claim 1 wherein step F comprises determining that said CATV RF signal range falls under said power predetermined input signal range value and step G signal conditioning comprises signal amplification of said CATV RF signal.

4. The method of claim 1 wherein step F comprises determining that said CATV RF signal power range falls over said predetermined input signal range value and step G signal conditioning comprises signal attenuation of said CATV RF signal.

5. The method of claim 1 wherein step F comprises determining that said CATV RF signal slope range falls outside of said predetermined input signal range value and step G signal conditioning comprises signal equalization of said CATV RF signal.

6. The method of claim 1 wherein step L comprises determining that said CATV RF signal stream signal power range falls under said predetermined stream power range values and step M stream signal conditioning comprises signal amplification of said CATV RF signal stream.

7. The method of claim 1 wherein step L comprises determining that said CATV RF signal stream signal power range falls over said predetermined stream power range values and step M stream signal conditioning comprises signal attenuation of said CATV RF signal stream.

8. The method of claim 1 wherein step L comprises determining that said CATV RF signal stream signal slope range falls outside of said predetermined signal slope range values and step M stream signal conditioning comprises signal equalization of said CATV RF signal stream.

9. A method for the distribution of CATV RF signals comprising the steps of:
A. Providing a headend controller comprising a plurality of input ports, a system control unit and one or more output ports;
B. Providing a combined CATV RF signal stream comprised of a plurality of CATV RF signals, said CATV RF signals formed from upstream CATV RF signals delivered to said one or more input ports;
C. Evaluating said combined CATV RF signal stream to collect upstream CATV RF signal stream evaluation data comprising CATV RF signal stream power and CATV RF signal stream slope data;
D. Recording each said upstream CATV RF signal stream evaluation data at said system control unit;
E. Comparing said upstream CATV RF signal stream evaluation data against upstream predetermined signal stream range values comprising upstream CATV RF signal stream power range values and upstream CATV RF signal stream slope range values;
F. Determining whether said upstream CATV RF signal stream evaluation data falls outside of said upstream predetermined signal stream range values;
G. Applying signal conditioning to said CATV RF signal stream if said upstream CATV RF signal stream evaluation data falls outside of said predetermined stream signal range;
H. Duplicating said CATV RF signal stream to produce a second CATV RF signal stream;
I. Evaluating said CATV RF signal stream and said second CATV RF signal stream to collect downstream CATV RF signal stream evaluation data comprising CATV RF signal stream power and CATV RF signal stream slope data;
J. Recording each said downstream CATV RF signal stream evaluation data at said system control unit;
K. Comparing said downstream CATV RF signal stream evaluation data against downstream predetermined signal stream range values comprising downstream CATV RF signal stream power range values and downstream CATV RF signal stream slope range values;
L. Determining whether said downstream CATV RF signal stream evaluation data falls outside of said downstream predetermined signal stream range values;
M. Applying stream signal conditioning to one or more CATV RF signal streams if said stream signal evaluation data falls outside of said downstream predetermined signal stream range; and
N. Providing said CATV RF signal streams to said output port.

10. The method of claim 9 wherein step H comprises duplicating said CATV RF signal stream with an RF power splitter.

11. The method of claim 9 wherein step F comprises determining that said upstream CATV RF signal stream power range falls under said upstream predetermined signal stream range value and step G stream signal conditioning comprises signal amplification of said upstream CATV RF signal stream.

12. The method of claim 9 wherein step F comprises determining that said upstream CATV RF signal stream power range falls over said upstream predetermined signal stream range value and step G stream signal conditioning comprises signal attenuation of said upstream CATV RF signal stream.

13. The method of claim 9 wherein step M comprises determining that said upstream CATV RF signal stream power range falls outside of said upstream predetermined signal slope range values and step G signal conditioning comprises signal equalization of said upstream CATV RF signal stream.

14. A method for the distribution of CATV RF signals comprising the steps of:
A. Providing a headend controller, said headend controller comprising one or more of input ports, a system control unit and one or more output ports;
B. Providing CATV RF signals to said one or more input ports;
C. Evaluating each said CATV RF signal to collect input signal evaluation data corresponding to each said CATV RF signal, said input signal evaluation data comprising CATV RF signal power and CATV RF signal slope data;
D. Comparing each said input signal evaluation data against system predetermined input signal range values, said predetermined signal range values comprising CATV RF signal power range values and CATV RF signal slope range values;

E. Determining whether said input signal evaluation data falls outside of said predetermined input signal range values for each said CATV RF signal; and F. Applying signal conditioning to each said CATV RF signal having input signal evaluation data outside of said system predetermined input signal range values.

15. The method of claim 14 wherein step C comprises recording each said input signal evaluation data corresponding to each said CATV RF signal at said system control unit.

16. The method of claim 14 comprising the steps of:

G. Aggregating each said CATV RF signals into a combined CATV RF signal stream;

I. Evaluating said combined CATV RF signal stream to collect signal stream evaluation data corresponding to said CATV RF signal stream, said signal stream evaluation data comprising CATV RF signal power and CATV RF signal slope;

K. Comparing each said signal stream evaluation data against predetermined signal stream range values comprising signal stream power range values and signal stream slope range values;

L. Determining whether said signal stream evaluation data falls outside of said predetermined signal stream range;

M. Applying signal stream conditioning to CATV RF signal stream if said signal stream evaluation data falls outside of said predetermined signal stream range; and N. Providing said CATV RF signal stream to said output port.

17. The method of claim 16 wherein step I comprises recording said signal stream evaluation data at said system control unit.

* * * * *